(12) United States Patent
Henrotte et al.

(10) Patent No.: US 7,524,175 B2
(45) Date of Patent: Apr. 28, 2009

(54) METHOD AND APPARATUS TO VENT A MOLD

(75) Inventors: Eric Michel Henrotte, Saint-Leger (BE); Klaus-Dieter Schultz, Hanau (DE); Alessandro Molinari, Luxembourg Ville (LU); Yacine Ouyahia, Bereldange (LU); Gerard Louis Marie Schmit, Attert (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/934,950

(22) Filed: Nov. 5, 2007

(65) Prior Publication Data

US 2008/0088057 A1    Apr. 17, 2008

Related U.S. Application Data

(63) Continuation-in-part of application No. 11/021,648, filed on Dec. 22, 2004, now abandoned.

(51) Int. Cl.
*B29C 33/10*    (2006.01)

(52) U.S. Cl. .................... 425/46; 425/28.1; 425/812

(58) Field of Classification Search ............... 425/28.1, 425/46, 812
See application file for complete search history.

(56) References Cited

U.S. PATENT DOCUMENTS 3,553,790 A * 1/1971 Brobeck et al. ............. 425/812
4,553,918 A * 11/1985 Yoda et al. .................... 425/46
4,576,559 A * 3/1986 Yoda et al. ................. 425/28.1
4,708,609 A * 11/1987 Yoda et al. ................. 425/28.1
4,740,145 A     4/1988 Shurman ..................... 425/28
2002/0119209 A1  8/2002 Tanaka ........................ 425/46

FOREIGN PATENT DOCUMENTS

WO        WO 88/01927      3/1988

\* cited by examiner

*Primary Examiner*—James Mackey
(74) *Attorney, Agent, or Firm*—June E. Rickey

(57) ABSTRACT

A method and apparatus for venting a mold for vulcanizing a tire is provided. The mold comprises a plurality of tread segments for forming the tread on a green tire, wherein each of said tread segments further comprises an outer cavity plate having an interior surface and an exterior surface, the cavity plate having a plurality of channels. Each of the channels has a vent hole extending from the channel to the exterior surface of the outer cavity plate, and a rib mounted over the channel. The adjoining surface of the rib mating with the interior surface of the cavity plate, wherein one of the mating surfaces has a roughened surface forming a vent passageway with the interior surface of the cavity plate for venting mold gasses from the interior of the mold to the exterior of the mold. The invention may further include a blade and blade passageway wherein the blade outer surface has a rough outer surface for forming a vent passageway with the blade passageway.

10 Claims, 10 Drawing Sheets

METHOD AND APPARATUS TO VENT A MOLD

This application is a continuation in part of and claims priority to Ser. No. 11/021,648, filed Dec. 22, 2004, now abandoned, which is fully incorporated herein by reference.

FIELD OF The INVENTION

The invention relates to a method and apparatus for venting a vulcanization mold, and more particularly to a vulcanization mold for making rubber products such as a tire.

BACKGROUND OF THE INVENTION

Tires have long been manufactured by vulcanization within a tire mold. Typical tire molds have small holes or vents to allow air trapped within the mold to escape. After the tire is vulcanized and removed from the mold, tiny rubber burrs or extensions extend radially outward from the tire. These burrs are formed from rubber trapped within the vents of the mold. These rubber burrs are a waste of rubber, and detract from the appearance of the tire. The removal of the burrs requires an extra manufacturing step. In addition, the mold vents must be periodically cleaned in order to maintain the vents.

Some prior art molds utilize vent holes wherein blocking members are inserted in the holes and function to prevent the burrs. The use of these blocking members while preventing the rubber burrs, have the disadvantage of producing a small mark on the tire surface. In addition, the blocking members must be cleaned periodically or replaced. Thus an improved ventless mold is desired wherein no marks or burrs are formed on the tire.

SUMMARY OF THE INVENTION

The invention provides in one aspect a mold for vulcanizing a tire, the mold comprising a plurality of tread segments for forming the tread on a green tire, wherein the tread segments can be assembled side by side circumferentially about the green tire, each of said tread segments further comprised of an outer cavity plate having an interior surface and an exterior surface, said cavity plate having a plurality of channels, each of said channels having a vent hole extending from the channel to the exterior surface of the outer cavity plate; each of said channel having a rib mounted thereover, the adjoining surface of said rib mating with the interior surface of the cavity plate, wherein the adjoining surface located about the perimeter of said rib has a roughened surface forming a vent passageway with the interior surface of the cavity plate for venting mold gasses from the interior of the mold to the exterior of the mold.

The invention provides in a second aspect a mold for vulcanizing a tire, the mold comprising a plurality of tread sgements for forming the tread on a green tire, wherein the tread segments can be assembled side by side circumferentially about the green tire, each of said tread segments further comprised of an outer cavity plate habing an interior surface and an exterior surface, said cavity plate having a plurality of channels, each of said channels having a vent hole extending from the channel to the exterior surface of the outer cavity plate; each of said channel having a rib mounted thereover, the adjoining surface of said rib mating with the interior surface of the cavity plate, wherein the interior surface of the cavity plate has a roughened surface forming a vent passageway with the adjoining surface of the ribs for venting mold gasses from the interior of the mold to the exterior of the mold.

The invention provides in another aspect a method of making a tread segment for use in a mold, the tread segment having a plurality of ribs and lands, the method comprising the steps of: providing a cavity contour plate having an interior surface and an exterior surface, roughing the interior surface of the cavity contour plate to a surface roughness of about 10 to about 40 microns, forming a plurality of channels in the interior surface of the cavity contour plate at the location of the ribs; forming a vent hole in each channel to the exterior surface of the cavity contour plate, securing an inner surface of a tread profile plate to the interior surface of the cavity contour plate at the location of the ribs, and forming the ribs from the tread profile plate.

The invention provides in yet another aspect a method of making a tread segment for use in a mold, the tread segment having a plurality of ribs and lands, the method comprising the steps of: providing a cavity contour plate having an interior surface and an exterior surface, forming a tread pattern of channels on the interior surface of the cavity contour plate; forming one or more slots on the interior surface of the cavity contour plate; mounting a blade in each slot, wherein the outer surface of the blade has a roughened surface.

The invention provides in yet another aspect a mold for vulcanizing a tire, the mold comprising a plurality of tread segments for forming the tread on a green tire, wherein the tread segments can be assembled side by side circumferentially about the green tire, each of said tread segments further comprised of a cavity plate having an interior surface and an exterior surface, said cavity plate having a plurality of slots on the interior surface, one or more blades secured within each slot, an outer surface of said blade mates with an inner surface of said slot, wherein one of said mating surfaces is roughened relative to the other mating surface forming a vent passageway for venting mold gasses from the interior of the mold to the exterior of the mold.

Definitions

For ease of understanding this disclosure, the following terms are defined:

"Bead" means that part of the tire comprising an annular tensile member wrapped by ply cords and shaped, with or without other reinforcement elements such as flippers, chippers, apexes, toe guards, and chafers, to fit a design rim. The beads are associated with holding the tire to the wheel rim.

"Curing" means the process of heating or otherwise treating a rubber or plastic compound to convert it from a thermoplastic or fluid material into a solid, relatively heat-resistant state by causing cross-linking of the compound. When heating is employed, the process is called vulcanization.

"Elastomer" means a resilient material capable of recovering size and shape after deformation.

"Elastomeric article" is an article that is at least partially made from an elastomer.

"Innerliner" means the layer or layers of elastomer or other material that form the inside surface of a tubeless tire and that contain the inflating fluid within the tire.

"Pneumatic tire" means a laminated mechanical device of generally toroidal shape, usually an open torus, having beads and a tread and made of rubber, chemicals, fabric and steel or other materials. When mounted on the wheel of a motor vehicle, the tire, through its tread, provides traction and contains the fluid that sustains the vehicle load.

"Radial" and "radially" are used to mean directions toward or away from the axis of rotation of the tire when mounted in the mold.

BRIEF DESCRIPTION OF THE DRAWINGS

The invention will be described by way of example and with reference to the accompanying drawings in which.

DETAILED DESCRIPTION OF THE INVENTION

Figure 1:
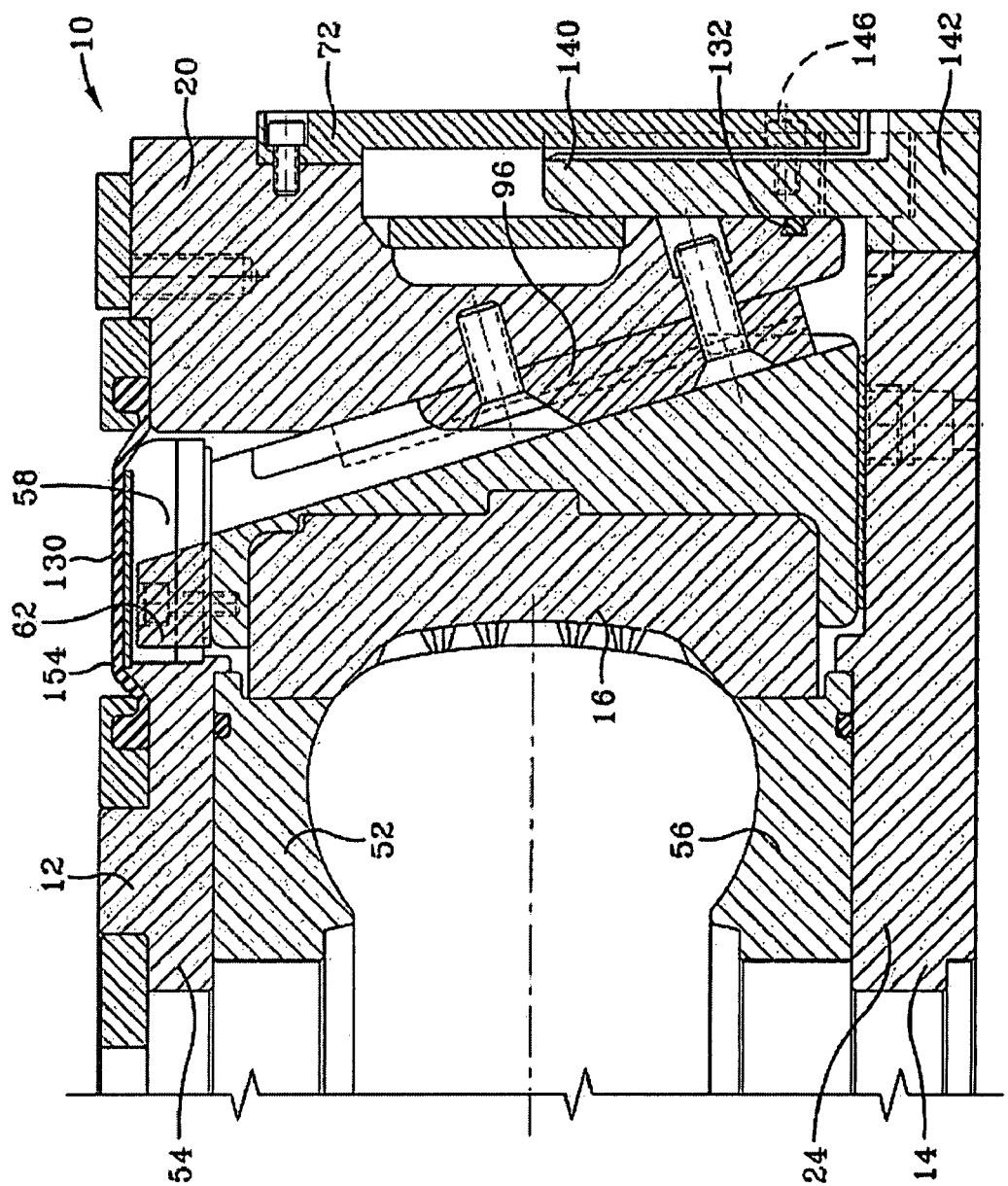
FIG. 1 is a cross-sectional partial view of a segmented mold.
Figure 2:
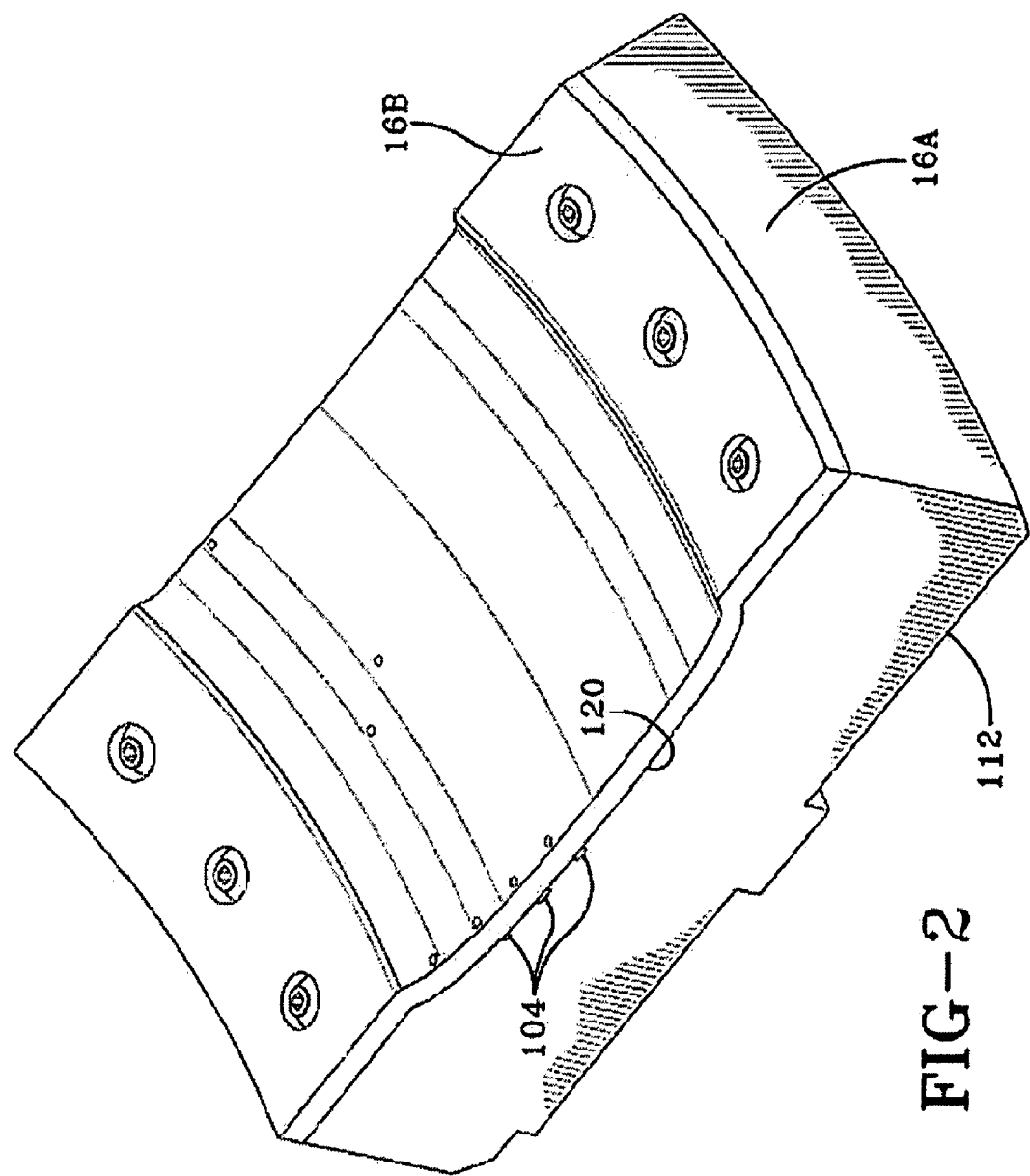
FIG. 2 is a perspective view of a blank tread mold segment.
Figure 3:
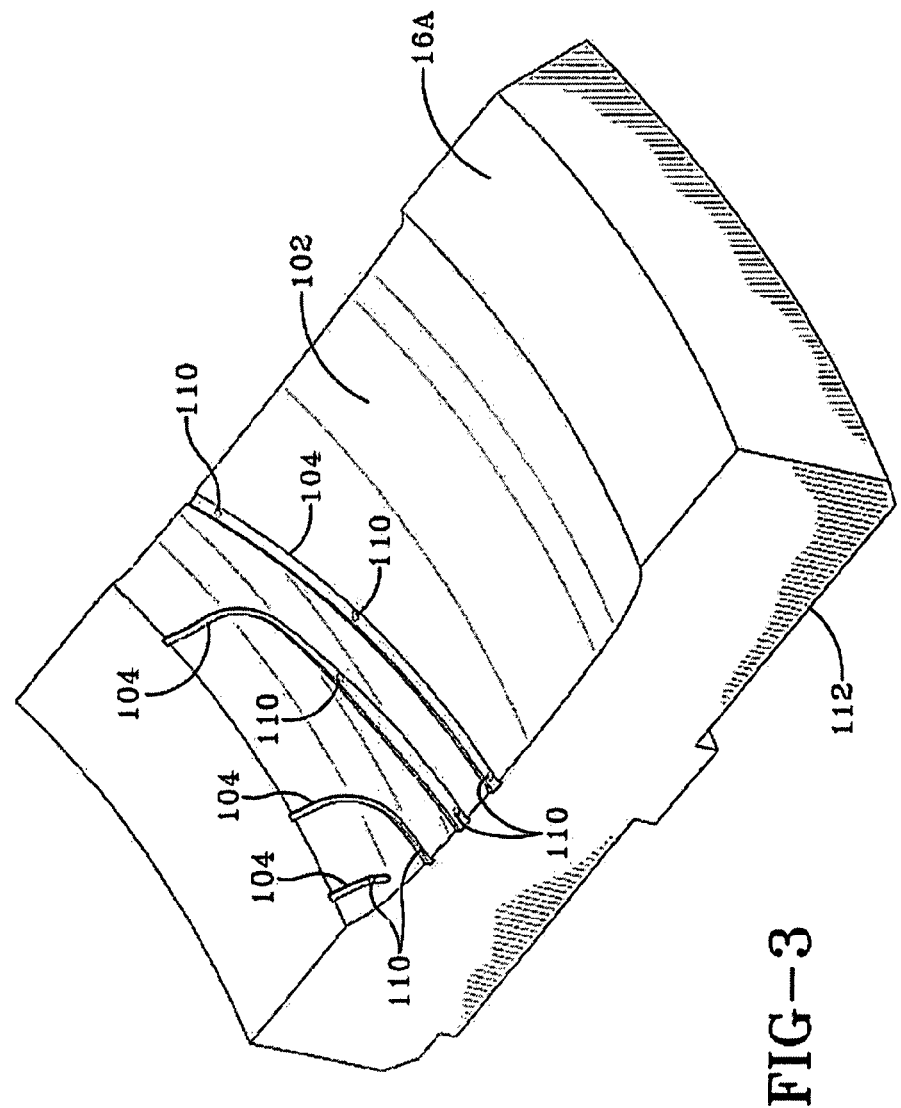
FIG. 3 is a perspective view of a mold cavity contour plate.
Figure 4:
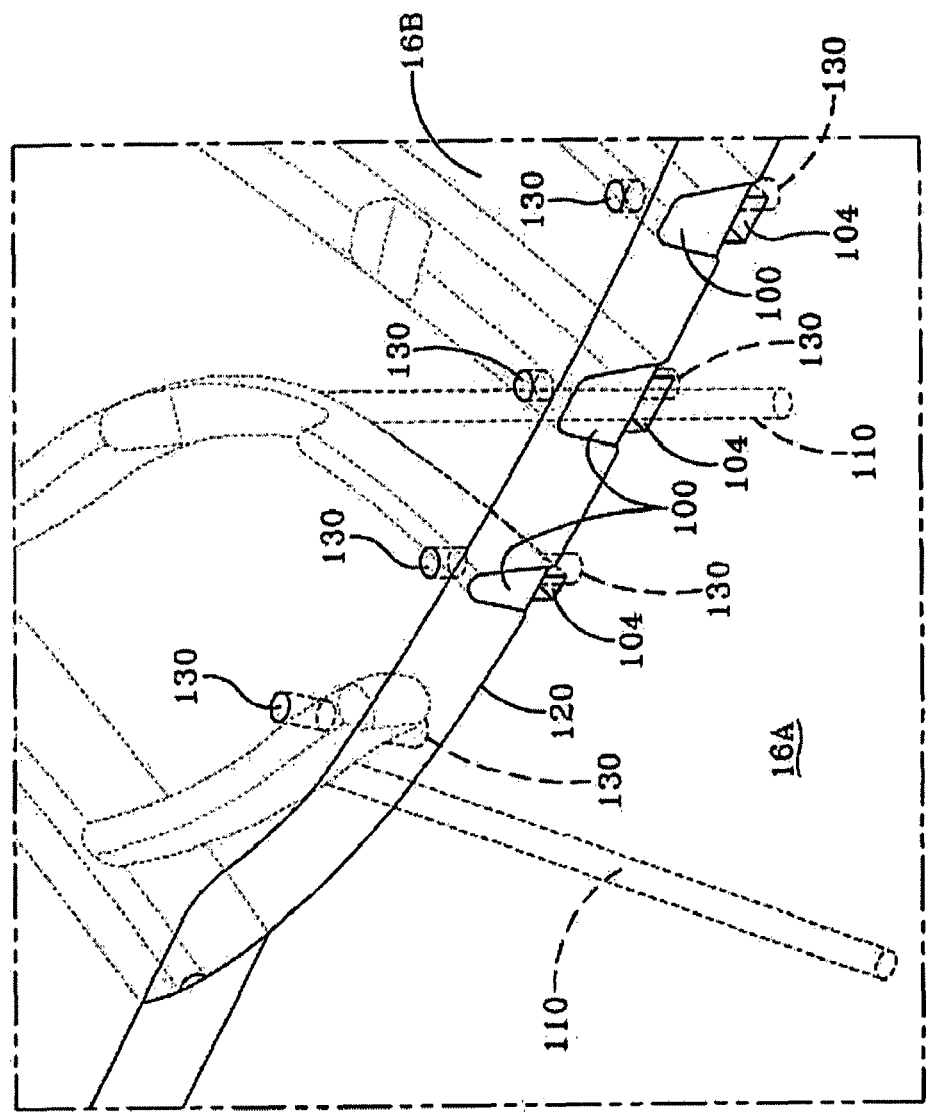
FIG. 4 is a close up perspective view of a mold cavity contour plate and a tread profile plate showing the ribs and lands to be milled.
Figure 5A:
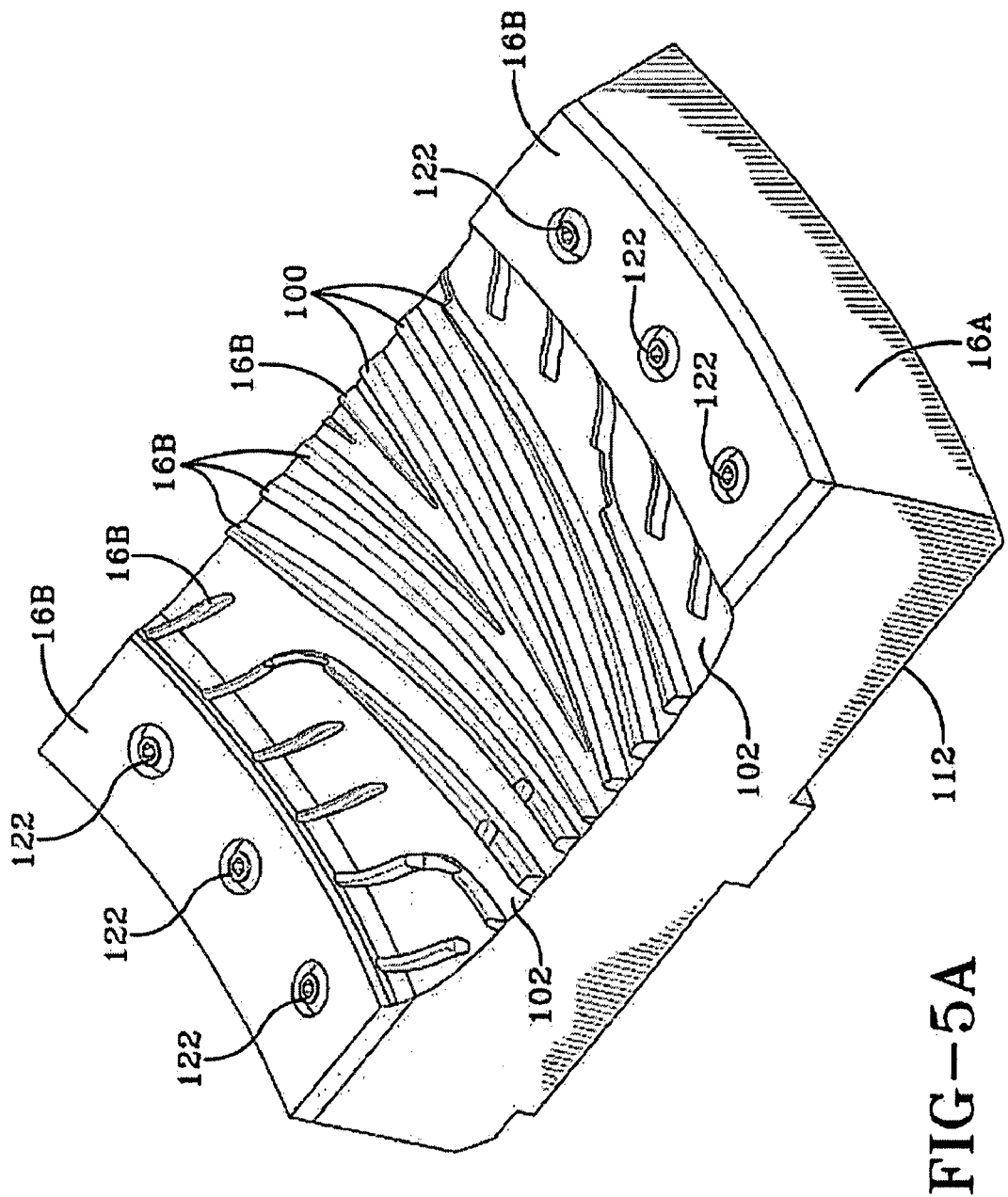
FIGS. 5A and 5B are perspective views of a tread mold segment of the present invention.
Figure 5B:
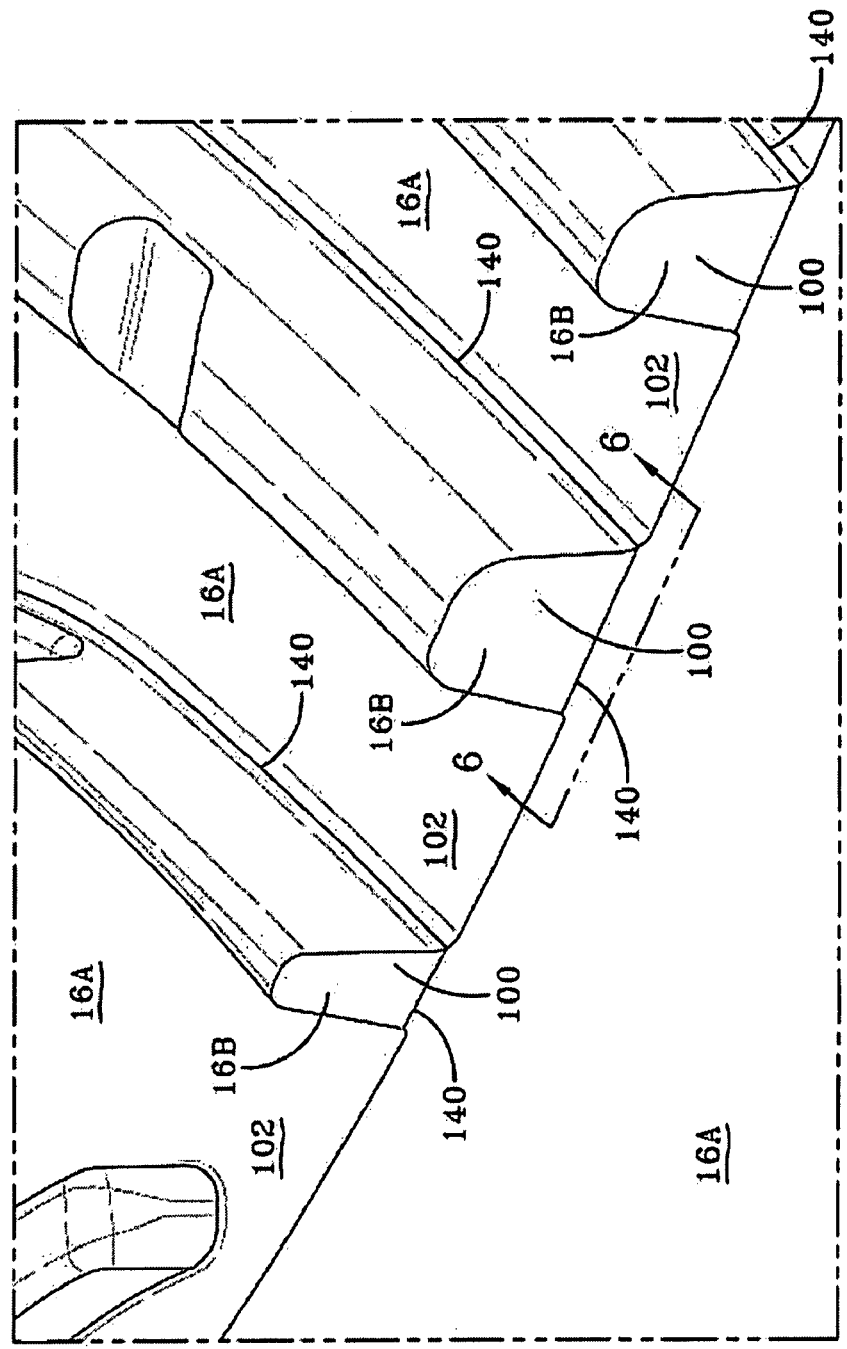
Figure 6:
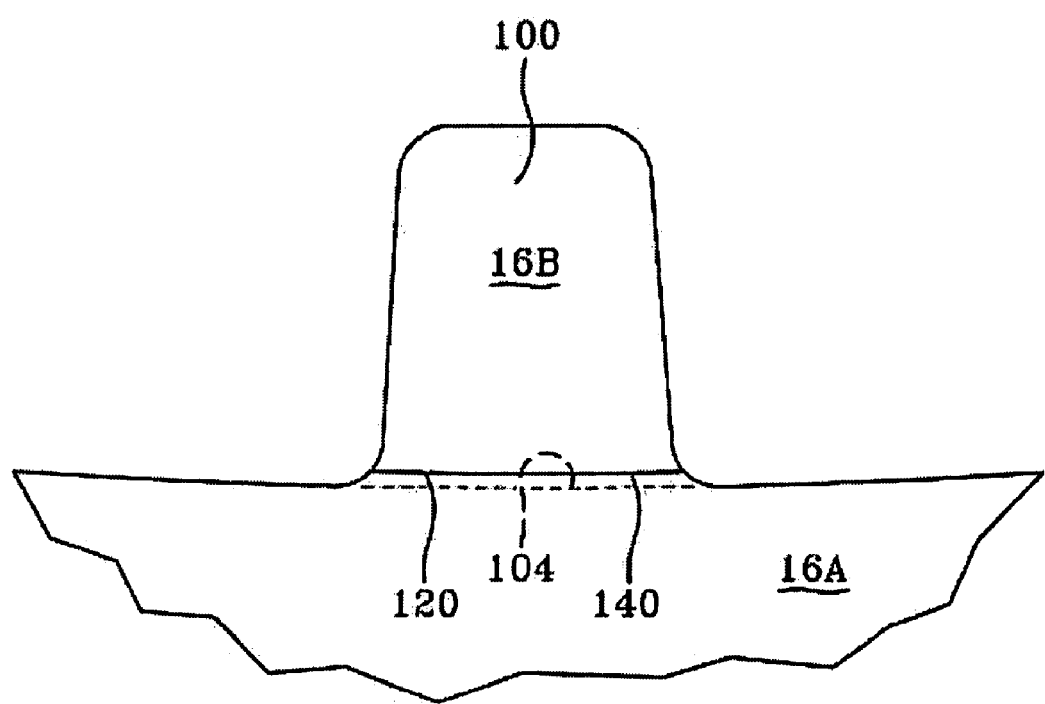
FIG. 6 is a close-up view of a rib and channel of the tread mold segment in the direction 6-6 of FIG. 5b.

The mold illustrated in FIG. 1 is a segmented mold 10. The segmented mold 10 includes upper and lower sidewall mold assemblies 12, 14 which together with a plurality of tread mold segments 16 define a tire mold cavity 18. The tread mold segments 16 are typically radially movable to assemble or disassemble the tire mold about the unvulcanized green tire. The tread mold segments 16 are connected to the upper sidewall mold member 52 by pocket type slots 58 which are closed at the top in the upper sidewall mold plate 52 and retainer tee members 62 on the tread mold segments 16 for sliding engagement in the pocket type slots. Lower sidewall mold plate 56 abuts and cooperates with lower mold support member 24. An actuating ring 20 produces radial movement of the tread mold segments 16. The actuating ring 20 is connected to the tread mold segments 16 via retraction tee bolts 96. Retainer tee members 62 slide within pocket type slots 58. The above description of a tire mold is just one example of a segmented mold which may be used with the invention, as other segmented mold designs as well as other mold designs, such as the two piece mold, may be used.

A first embodiment of the invention is shown in FIGS. 2-6. Each tread mold segment 16 comprises two pieces, a mold cavity contour plate 16A and a profile plate 16B. The mold 16 further comprises an outer surface 101 which forms the outer contour of the molded tire. This outer surface is designed to match as closely as possible the theoretical design contour of the tire. A tire tread design typically comprises a plurality of grooves on the tire (not shown) formed by ribs 100 on the tread segment mold plate 16. The tread outer NSK on the tire is formed by the lands 102 between the ribs 100 on the tread segment mold plate 16.

The following steps are performed in order to form the ribs and lands of the tread profile on the tread segment mold plate 16. The tread mold segment plate if formed from two plates 16A and 16B connected together. First, the outer surface 102 of contour plate 16A is machined to have a roughened surface, typically about 20 microns, but may range from about 10 to about 40 microns. The surface roughness may be in a pattern or be random in nature. One example of a surface pattern is a plurality of peaks and valleys joined with a curve or scallops wherein the peaks and valleys are oriented perpendicular to the ribs 100. The surface pattern is formed by milling. In this particular example, the outer mating surface 102 of cavity contour plate 16A when mounted into position in the mold, is located 0.3 mm (300 microns) radially inward (towards the mold cavity) of the desired tire tread contour line 101. However, the outer mating surface 102 may be located in the range of about 100 to 500 microns radially inward of the contour line 101. Thus the contour plate is thicker (in the range of 100-500 microns) than desired at this point in the manufacturing process. Next, a plurality of channels 104 are milled in the outer surface 102 of the contour plate 16A, in the locations of where the ribs 100 will be located. The width of the channels is less than the width of the ribs. Next, vent holes 110 are drilled through cavity contour plate 16A channels to the exterior surface 112 of the cavity contour plate 16A.

Mating with the inner surface 102 of cavity contour plate 16A is the inner mating surface 120 of tread profile plate 16B. The inner mating surface 120 is relatively smooth compared to the mating surface of the tread profile plate 16B. For example, the inner mating surface 120 may have a surface roughness of about 0.015 mm (15 microns). Profile plate 16B is secured to cavity plate 16A via screws 122 so that the mating surfaces 102,120 contact with each other. Then holes 130 are drilled throughout 16A and 16B. The holes 130 are threaded and headless screws (not shown) are inserted (countersunk) therein. The holes 130 are located where the ribs 100 will be located. The holes are then filled by welding or other means known to those skilled in the art. The interface of the plates 102, 120 in this particular example (when assembled into the mold) is thus located 300 microns radially inward of the desired tread contour line 101. The location of the vent interface 140 of the rib radially inward of the tread contour line 100 allows for easier venting of the tread.

Next, the ribs 100 are formed by direct milling the desired rib shape from the profile plate 16B. Then the lands of the reverse tread profile are milled into both the profile plate 16b and the cavity plate 16A. Thus all that remains of the profile plate 16B is the ribs 100. In this example, the cavity plate is milled to a depth of about 300 microns, forming the tread contour surface 101.

The mating surface where the ribs are joined to the contour plate 16A have a surface roughness forming pathways in the crevices to vent mold gases. The vent gases can escape through the interface 140 of the ribs and contour plate, wherein the interface of the plates 16A,B is located about 0.3 mm (300 micron) radially inward of the tread contour 101 of the tire mold. The vent gases are vented through the rib/contour plate interface and down into the channels 104 located underneath the ribs. The channels have vent holes to allow the gases to vent to the exterior surface 112 of the tread segments.

In a second embodiment of the invention, the above description of the steps to form the tread mold segments 16 comprised of the mold cavity contour plate 16a and profile plate 16B are the same, except for the following. The outer mating surface 120 of the profile plate 16B is milled rough with the peaks having a height of about 0.02 mm (20 microns). For example, the outer mating surface may be milled to have a scallop pattern. The peaks are oriented perpendicular to the ribs 100. The adjoining surface of the cavity contour plate is milled relatively smooth, with a surface roughness for example, on the order of about 0.015 mm (15 microns), wherein the peaks are aligned perpendicular to the peaks of the profile plate 16B.

Figure 7:
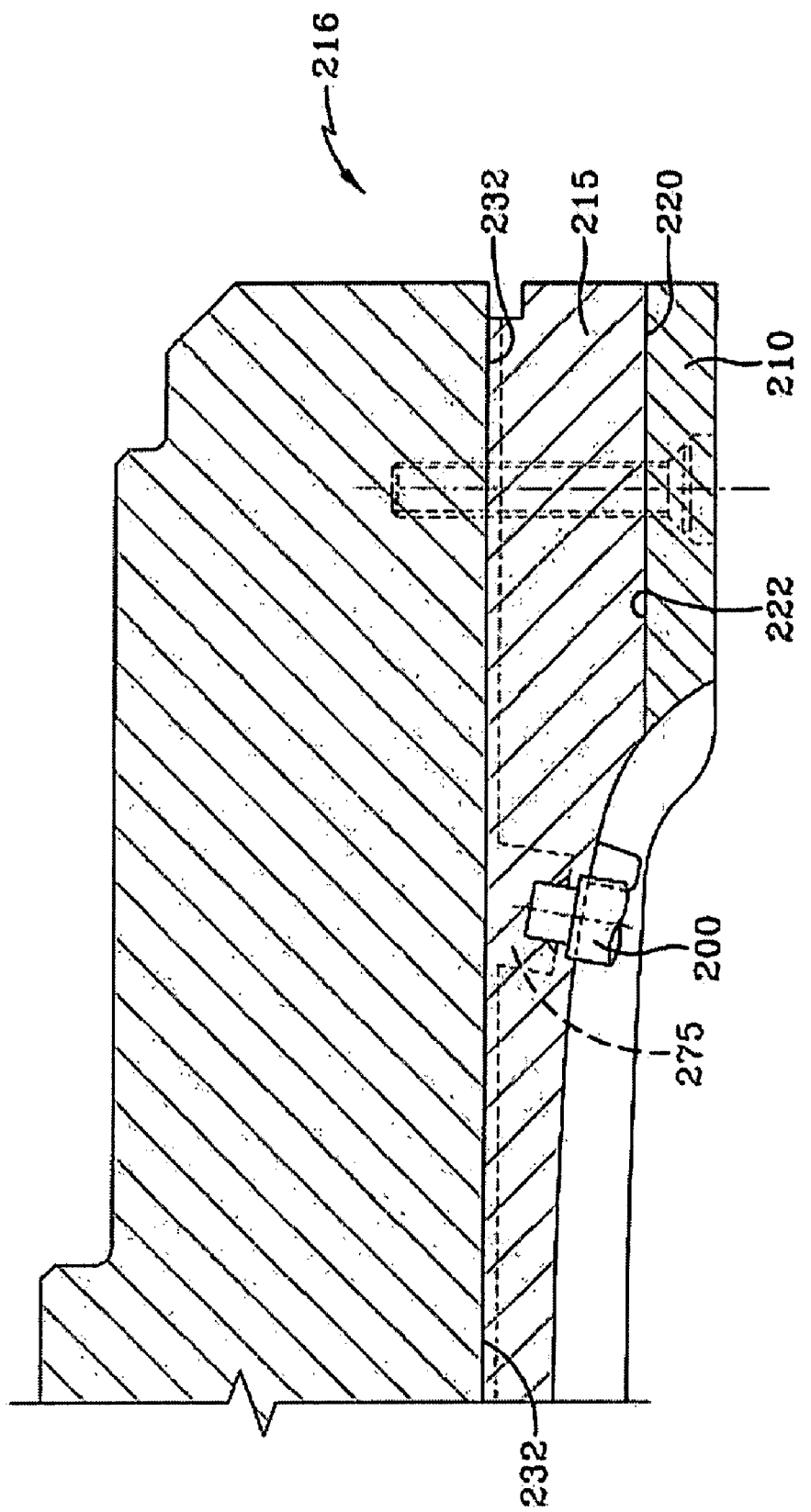
FIG. 7 is a cross-sectional view of a second embodiment of the invention having a mold cavity contour plate, a mold backing plate and a tread profile plate.
Figure 8:
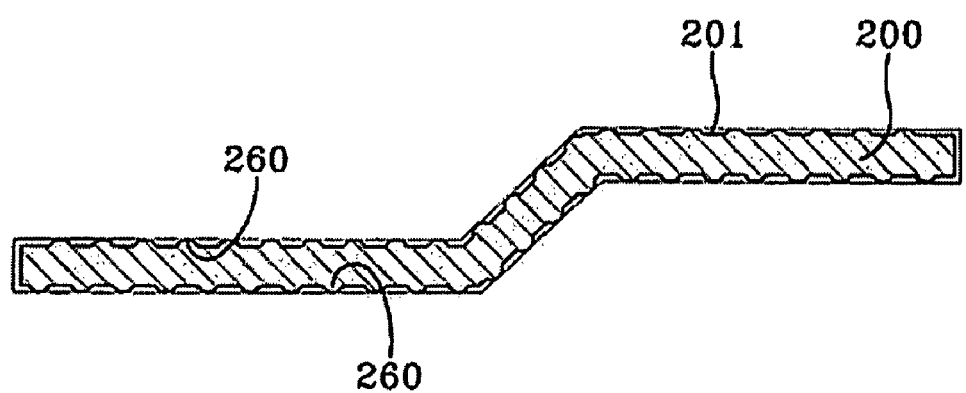
FIG. 8 is a top view of the blade mounted within the slot.
Figure 10:
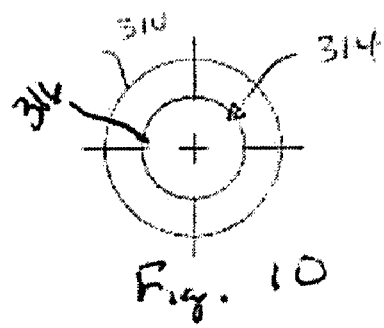
FIG. 10 is a top view of FIG. 9.
Figure 12:
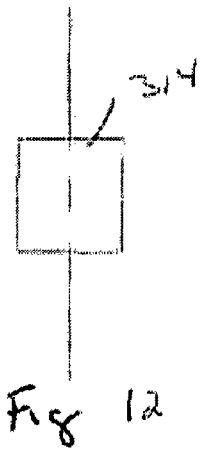
FIG. 12 is a side view of a cap used in the mold pin of FIG. 9.

In a third embodiment of the invention, blades 200 may be utilized in the tread segments 216. The blades are used to form the sipes in the tread shoulder. In this embodiment shown in FIGS. 7-8, the tread segment is comprised of three plates: a mold backing plate 205, a tread profile plate 210, and a mold cavity contour plate 215. The mold cavity contour plate 215 is sandwiched between the mold backing plate 205 and the tread profile plate 210. The upper surface 220 of the mold cavity contour plate 215 is mated to the inner surface 222 of the tread profile plate. The upper surface 220 of the mold cavity contour plate 215 may be machined to have a rough surface on the order of about 20 microns, but may range from about 10 to about 40 microns. The upper surface of the mold cavity contour plate is located radially inward of the mold tread contour line, in the range of about 100 to 500 microns, typically 300 microns. A plurality of channels (not shown) are milled into the upper surface 220 of the contour plate 215 to be located under the ribs 240. Each channel has one or more vent holes (not shown). Vent passageways 232 are milled at the back of the cavity contour plate to the exterior surface of the cavity contour plate. Passageways 232 join vent holes and the recesses 275 so that gasses may vent from interior of the mold to exterior of the mold. The upper surface 220 of the mold cavity contour plate 215 further comprises a plurality of slots 260 having a desired cross-sectional shape to mate with the sipe-forming blades 200. The slots are milled into the tread surface at a depth of about 3 mm.

Inserted within each slot is a metal blade 200 having outer surfaces 201 having a surface roughness of about 0.02 mm (20 microns), but may range from about 10 microns to about 40 microns. The roughened surface of the blade may be formed by knurling or other means known to those skilled in the art. The roughened surface mating within the slot provides a vent pathway to vent the blades. The blades are secured to the contour plate via welds or other means known to those skilled in the art. The backside 270 of the mold cavity contour plate 215 has recesses 275 which allow for welding or securing the blades and further provide a vent passageway for the air venting from the blades.

Mating with the upper surface 220 of cavity contour plate 215 is the inner mating surface 222 of tread profile plate 210. The inner mating surface 222 is relatively smooth compared to the mating surface 220 of the cavity contour plate 215. Alternatively, the inner mating surface of the tread profile plate may be roughened, while the upper surface of the cavity contour plate may be machined relatively smooth. Tread profile plate 210 is secured to cavity plate via screws so that the mating surfaces contact with each other. Then holes are drilled throughout both plates. The holes 130 are threaded and headless screws (not shown) are inserted (countersunk) therein. The holes 130 are located where the ribs 100 will be located. The holes are then filled by welding or other means known to those skilled in the art.

Next, the lands and grooves of the tread profile are milled into the profile plate and cavity plate. Thus, the mating surface where the ribs are joined to the contour plate have a surface roughness forming a pathway to vent mold gases. The vent gases can escape through the interface of the ribs and contour plate which is located about 0.3 mm above or radially inward of the external contour of the tire. The vent gases are also vented through the blade/slot interface in the contour plate and out through the backside of the contour plate.

Figure 9:
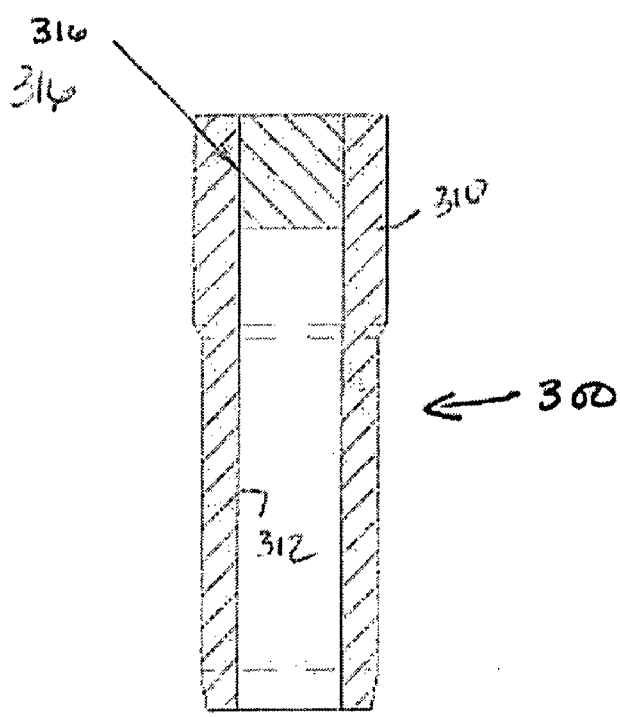
FIG. 9 is a cross-sectional side view of a mold pin of the present invention.
Figure 11:
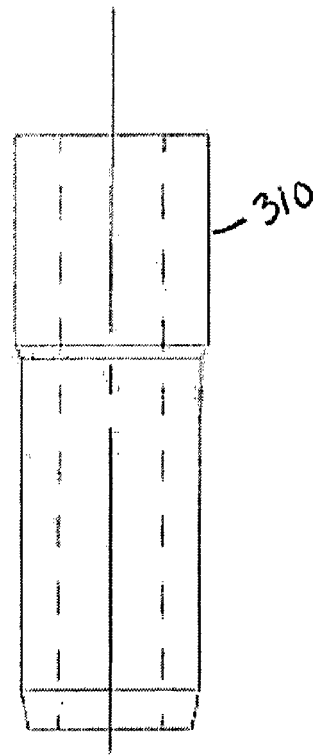
FIG. 11 is a side view of FIG. 9.

FIG. 9-12 illustrate a fourth embodiment of the invention for venting a mold. FIG. 9 shows the cross sectional view of a mold pin 300 which is mountable in a mold for venting the gasses. The mold pin 300 is typically cylindrical in shape and comprises a tubular housing 310 having an inner cylindrically shaped hole 312 therethrough. Seated within the tubular housing 310 is a cap 314. The cap 314 has an outer surface is machined to have a roughened surface, typically about 20 microns, but may range from about 10 to about 40 microns. The inner portion of the hole 312 that mates with the cap 314 is relatively smooth. The cap 314 is inserted into the tube 312 with a tight fit, typically by heating or cooling one part relative to the other part, forming an interference fit. Alternatively, a portion of the inner hole 312 may be machined to a roughened surface, typically in the range of about 10 to about 40 microns, while the outer cap surface is machined smooth.

When the mold pin is inserted in a bore of a tire mold, the mold gasses may vent through the plug 300 at the surface interface 316 formed between the outer surface of the cap 314 and the inner portion of the hole 312. The mold pin may be sized as desired, and may typically have an outer diameter in the range of 1 mm to 30 mm.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A mold for vulcanizing a tire, the mold comprising a plurality of tread segments for forming the tread on a green tire at a tread mold contour line, wherein the tread segments can be assembled side by side circumferentially about the green tire, each of said tread segments further comprised of an outer cavity plate having an interior surface and an exterior surface, said cavity plate having a plurality of channels on said interior surface and each of said channels having a vent hole extending from the channel to the exterior surface of the outer cavity plate; each of said channels having a rib mounted thereover, the adjoining surface of said rib is mating with the interior surface of the cavity plate at a location radially inward of the tread mold contour line, wherein the adjoining surface is located about the perimeter of said rib and wherein one of the rib adjoining surface and the cavity plate interior surface has a roughened surface relative to the other surface, forming a vent passageway with the channels and vent holes of the cavity plate for venting mold gasses from the interior of the mold to the exterior of the mold.

2. The mold of claim 1 wherein the adjoining surface of said rib mating with the interior surface of the cavity plate is located radially inward of the mold contour line of the tire in the range of about 100 to about 500 microns.

3. The mold of claim 1 wherein the adjoining surface of said rib has a roughened surface on the order of about 10 to about 40 microns.

4. The mold of claim 1 wherein the adjoining surface of said rib has a roughened surface on the order of about 20 microns.

5. The mold of claim 1 wherein the adjoining surface of said rib has a roughened surface formed of peaks and valleys, wherein the peaks are oriented perpendicular to the adjoining surface of said rib.

6. The mold of claim 1 wherein the adjoining surface of said rib has a roughened surface having a scalloped pattern.

7. The mold of claim 1 wherein the interior surface of the cavity plate has a roughened surface.

8. The mold of claim 7 wherein the interior surface of said cavity plate has a roughened surface on the order of about 10 to about 40 microns.

9. The mold of claim 7 wherein the interior surface of said cavity plate has a roughened surface on the order of about 20 microns.

10. The mold of claim 7 wherein the interior surface of said cavity plate has a roughened surface formed of peaks and valleys, wherein the peaks are oriented perpendicular to the interior surface of said cavity plate.

* * * * *